July 17, 1951  B. H. SCOTT  2,560,783
MOLDING APPARATUS
Filed Dec. 4, 1948  2 Sheets-Sheet 1

INVENTOR.
BENJAMIN H. SCOTT
BY Charles L. Willson
ATTORNEY

July 17, 1951  B. H. SCOTT  2,560,783
MOLDING APPARATUS
Filed Dec. 4, 1948  2 Sheets-Sheet 2
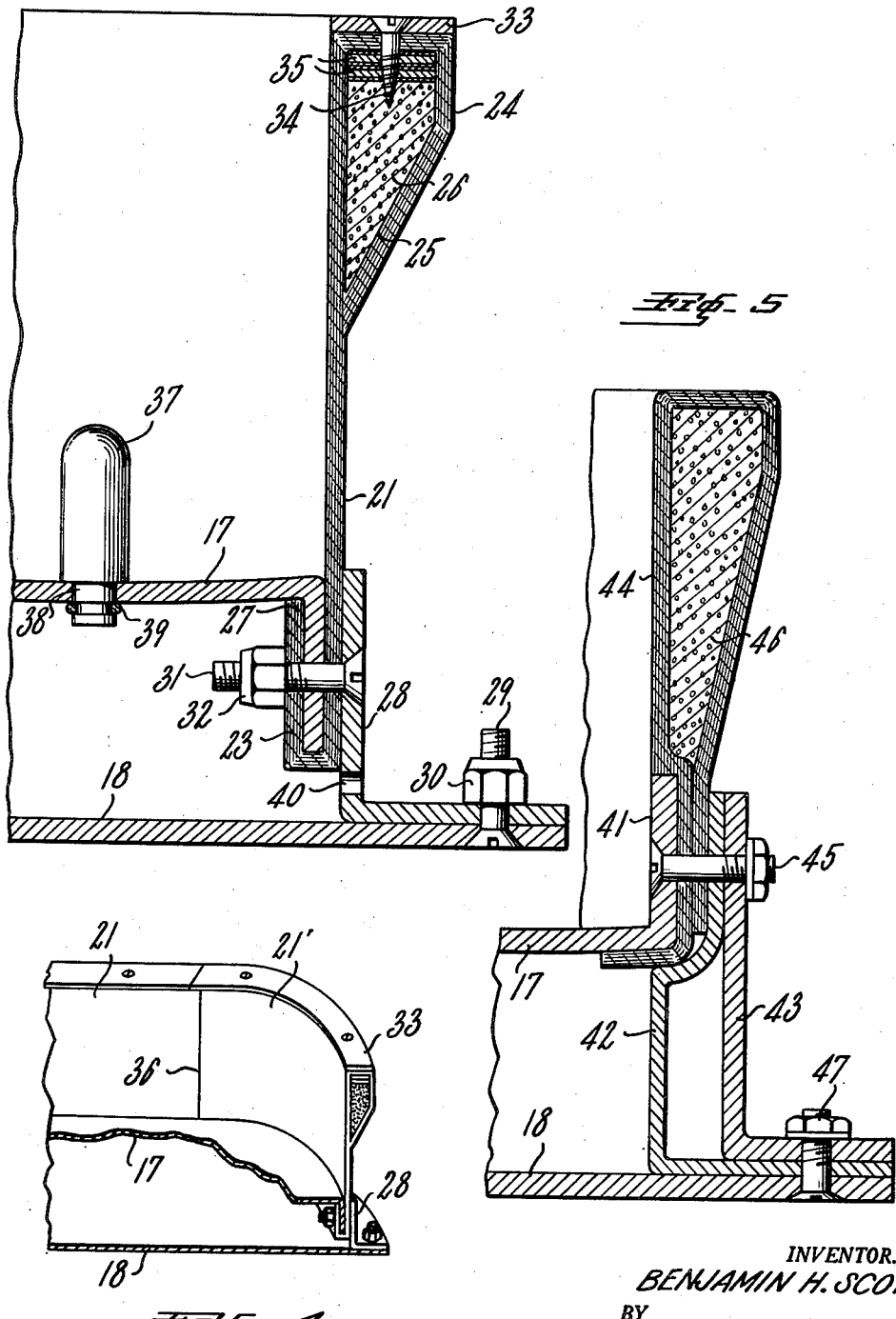
INVENTOR.
BENJAMIN H. SCOTT
BY
Charles C. Willson
ATTORNEY Patented July 17, 1951

2,560,783

UNITED STATES PATENT OFFICE 2,560,783

MOLDING APPARATUS

Benjamin H. Scott, Mishawaka, Ind., assignor to United States Rubber Company, New York, N. Y., a corporation of New Jersey Application December 4, 1948, Serial No. 63,483

5 Claims. (Cl. 18—39)

This invention relates to apparatus for molding sponge rubber such as latex foam, and more particularly to molds that are specially constructed for use when the latex foam is to be cured in a high frequency electrical field.

The general practice in use for years in making molded latex foam articles, such as cushions and mattresses, has been to pour foamed latex into an all metal mold, and then place this mold in a heated vulcanizing chamber to cure the rubber.

Recently it has been proposed to employ a high frequency electrical field to cure foamed latex, but this cannot be done when an all metal mold is used, since the high conductivity of the metal side walls of the mold serves to short circuit or greatly reduce the electrical resistance of the space between the eletrodes used to produce the high frequency field.

To overcome this difficulty in the use of a high frequency field it has been proposed heretofore to provide a non-metal mold in which the mold is formed of glass cloth impregnated with resin, but latex foam molds are subjected to hard usage in handling and in prying the mold open, and they tend to warp due to the temperature changes to which they are subjected. Therefore the construction of good latex foam molds suitable for use in a high frequency electrical field presents various problems.

The present invention relates to such molds which are sufficiently strong and durable to give good service and at the same time are sufficiently insulated electrically to avoid sparking or short circuiting the space between the electrodes.

More specifically the present invention contemplates a shaping mold for setting and curing foamed rubber in a high frequency electrical field, and which comprises a female mold member opened at its top and adapted to contain foamed rubber, and a relatively flat cover for said mold member, the floor of the mold member being made of metal while its upstanding sides are formed of a laminated resin impregnated material. These sides are shaped to form a surrounding insulating wall that is firmly secured to the metal floor. As a result of this construction in which the side walls of the mold are made of insulating material, while the bottom thereof or top and bottom are made of metal, a strong durable mold suitable for use in a high frequency electrical field that heats the foam internally is provided.

The above and other features of the present invention will be further understood from the following description when read in connection with the accompanying drawings, wherein;

Fig. 3 is an enlarged sectional view through part of the mold shown in Fig. 2.

Fig. 4 is a sectional view showing the construction of a rounded corner of the mold of Fig. 2; and Fig. 5 is a sectional view similar to Fig. 3 but shows a modification of the invention.

Figure 1:
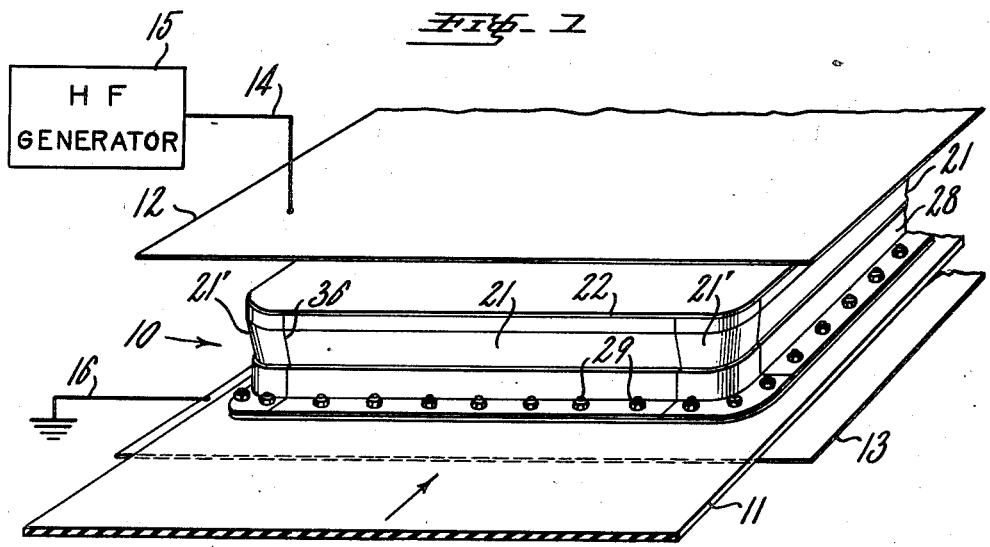
Fig. 1 is a perspective view of conveyor mechanism for conveying a mold constructed in accordance with the present invention through a high frequency electrical field.

Referring first to Fig. 1 of the drawing, there is shown a shaping mold which is constructed in accordance with the present invention, and this mold is designated in its entirety by the numeral 10. The mold 10 is shown as resting upon a rubber conveyor belt 11 which is advanced, by means not shown, in the direction indicated by the arrow, to thereby advance the mold 10 between an upper electrode 12 and lower electrode 13 preferably formed of relatively large metal sheets that are mounted in spaced parallel relation to each other and a sufficient distance apart to permit the belt 11 to convey the mold 10 through the high frequency electrical field established between these plates 12 and 13. The upper electrode 12 is shown as connected by the conductor 14 to a high frequency generator 15, and the lower electrode 13 is shown as grounded by the conductor 16.

Figure 2:
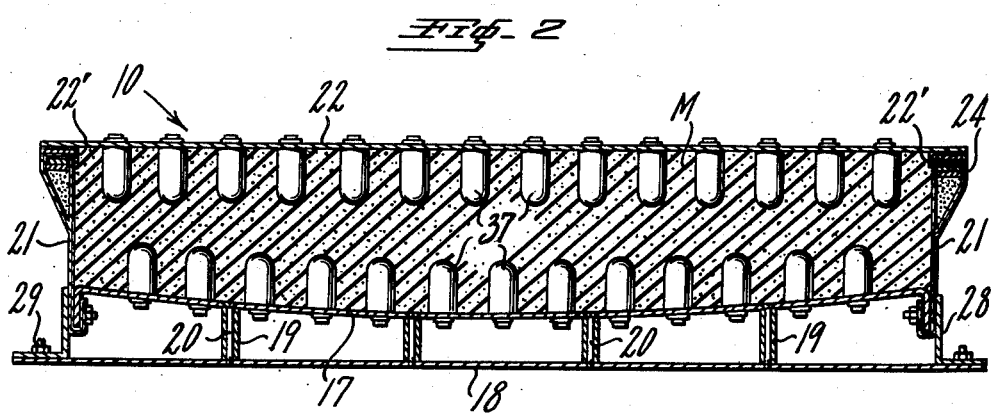
Fig. 2 is a transverse sectional view through the mold shown in Fig. 1.

The size and shape of the mold 10 for foam rubber may be varied extensively and that shown in the drawing is of the type commonly employed to mold latex sponge mattresses for use on various sized beds. Such molds are made considerably longer than they are wide. Therefore only part of the length of the mold 10 is shown in Fig. 1 where one end and part of one side of the mold is seen. In Fig. 2 a slightly enlarged transverse section of the mold of Fig. 1 is shown, and comprises a female mold member having the curved inner floor 17 and flat outer floor 18. These floors are preferably formed of metal to supply the desired strength. The inner floor 17 is curved as shown to give a slight crown to the top surface of the mattress M formed of latex foam, the mattress being produced in an upside down position in the mold. The lower floor 18 is provided to protect the curved inner floor 17 and to provide the mold with a flat bottom surface so that it will rest firmly on the conveyor belt 11 and other supporting means. The inner floor 17 is secured in spaced relation to the outer floor 18 by a number of hollow tubes 19 extending between these two floors and firmly secured therebetween by the bolts 20.

The upstanding side walls comprising the straight sides 21 and rounded corners 21' of the female mold member, in accordance with the present invention, are made of a strong durable insulating material such as multiple layers of glass cloth that are impregnated and bonded together with a suitable resin.

The female mold member so far described is adapted to contain a predetermined quantity of foamed rubber and this mold member is closed by a relatively flat cover 22 which is preferably formed of metal and when the mold is closed the cover rests upon the upper edge portion of the non-conducting walls 21, 21'. This cover 22 has the positioning inner flanges 22' adapted to engage the inner face of such walls.

If a mold constructed in accordance with the present invention is relatively large as is required to mold mattresses, the entire structure must be made strong in order to withstand the various forces to which it is subjected when the mold is moved from place to place, and particularly when the cover 22 is pried off of the female mold member. When the entire mold is constructed of metal, as was the common practice heretofore, it is not very difficult to so design the mold that the various portions thereof will possess the required strength, but when the upstanding side walls of the mold are to be formed of non-conducting fibrous material, as contemplated by the present invention, the problem of constructing these side walls so that they will possess the requisite strength present serious difficulties.

One good practical way of constructing such non-conducting side walls is best shown in Fig. 3 of the drawing, wherein the side wall is formed of a resin-impregnated laminated material such for example as approximately eight sheets of woven glass cloth that are impregnated with a resin and preferably with a so-called "contact resin" or "low pressure resin" which contains no solvent. Such a resin is strong, durable, inert, easy to cure and possesses many other advantages. The sides of the molding receptacle are preferably formed of molded straight side strips 21 and molded rounded corner strips 21'. After these strips 21 and 21' have been molded, they may be secured in place to form the surrounding side walls of the mold.

In the embodiment shown in Figs. 1 to 4 inclusive of the drawing, each wall section 21 and 21' of the mold is preferably given the construction in cross-section shown in Fig. 3 in which it will be seen that the lower portion of the laminated wall 21 is bent upwardly to form the U-shaped flange portion 23, and the upper portion of the laminated sheet is bent over upon itself as indicated at 24 to form a rounded hollow bead. The hollow area of this bead is completely closed by the downwardly inclined leg portion 25 of the laminated sheet. The hollow bead thus formed adjacent the upper edge of the side wall of the mold greatly increases the strength of this portion of the mold which supports the cover plate 22, and the strength of this bead may be further increased by filling the hollow area with some light moldable material such as cellular cellulose acetate 26.

In order to secure the side walls 21 and 21' very firmly to the floor structure of the mold the inner floor 17 is preferably formed adjacent its marginal edges with the downwardly turned flanges 27, which are adapted to fit snugly in the U-shaped portion formed by the lower portion of the side walls 21 and the upturned flange portion 23. Further strength is secured by providing the L-shaped angle bars 28 adapted to be rigidly secured to the upper face of the outer floor 18 by the bolts 29 having the clamping nuts 30, and the upstanding portion of this flange 28 is positioned to engage the outer face of the lower portion of the wall 21 and is bolted to the flanges 23, 27 and 28 by the through bolts 31 and nuts 32. The corner sections 21' are similarly bolted to the floors 17 and 18 of the mold. In order further to protect the upper edge portion of the insulating walls 21, 21' the flat upper face of the beaded portion of these walls may have secured thereto the protecting metal strips 33 which are secured in place by the screws 34. These screws may engage strengthening strips 35 positioned inside of the hollow bead and which serve primarily to fasten straight wall sections 21 and curve wall sections 21' together at their junction lines 36.

Since it is customary to make these foamed latex mattresses several inches thick, it is the usual practice to form them with deep core holes extending inwardly from the upper and lower face. These core holes are conveniently formed by securing to the inner face of the curved inner floor 17 and the inner face of the flat cover 22 the inwardly extending cores 37, which are preferably formed of varnished wooden pins, to thereby avoid the use of metal cores which would be objectionable in a high frequency electrical field. These cores 37 are conveniently secured in place by providing each wooden core with a reduced shank 38 that extends through a drill hole in the floor 17 or cover 22 and is secured in place by means of a C-shaped ring 39 which is pressed about such shank to fit snugly in an annular groove formed about the shank, so that the ring when secured in said groove will lock the wooden core in place as best shown in Fig. 3. It will be noted that an inner chamber of substantial size is formed within the bottom portion of the mold between the floors 17 and 18. It is desired to provide for circulation of air through this space. This may be accomplished by forming drill holes 40 in the flange bar 28 so that air may enter and exit through these holes.

It will be seen that by employing the construction shown in Figs. 1 to 4 inclusive, the side walls disposed between the upper floor 17 and cover 22 are made of non-conducting material, to thereby avoid the use of metal in these walls that would promote arcing or short circuiting of the current that should go through the foamed mass M to gel and cure the same.

In the modified construction of Fig. 5, the non-metallic side walls are reinforced for a short distance above the upper floor plate 17. This construction provides additional strength in the side walls but increases slightly the tendency of the operating current to arc around the side walls of the mold. In the modified construction of Fig. 5, it will be noted that the inner floor 17 has the upwardly extending flange 41, and it has bolted to the outer floor 18 a curved inner flange bar 42 and the outer L-shaped flange bar 43. The non-metallic portion of such side wall is formed of a resin impregnated laminated sheet material 44 such for example as used in Figs. 1 to 4 inclusive, but this laminated material is molded to a somewhat different shape as will be apparent from Fig. 5, in which the laminated material is shown as bent in the shape of an inverted U with the ends of the legs lying between the flanges 41, 42, 43 and firmly secured therebetween by the bolts 45. The hollow space within the laminated U-shaped wall is preferably filled with some moldable material such as cellular cellulose acetate 46. The flange bars 42 and 43 are firmly secured to the lower floor plate 18 by the bolts 47.

The floors 17 and 18, the cover 22 and various angle bars are preferably formed of aluminum or other light weight non-corroding metal. The resin impregnated laminated walls are preferably formed of woven glass cloth impregnated and bonded together with a resin such as obtained by the copolymerization of a monoenic compound having a single ethylenic group $CH_2=C<$ with an unsaturated alkyd resin which is the reaction product of an ethylenic-alpha-beta dicarboxylic and with a glycol. As shown in the Ellis Patent No. 2,255,313, these resins may be formed by reacting an ethylene-alpha-beta dicarboxylic acid with a glycol, in such proportions that there are present in the reacting mixture about one carboxyl group in such unsaturated acid to one hydroxyl group in such glycol, to an advanced stage of esterification but short of becoming completely insoluble and infusible, until a product of low acid number is produced which is soluble in a liquid monomeric unsaturated polymerizable compound containing an ethylenic linkage, incorporating the product of such esterification with a liquid monomeric unsaturated polymerizable compound containing an ethylenic linkage, and thereafter subjecting said solution to conjoint polymerization.

These resins are also further described in Chapter 18, headed "Contact resins" of a book entitled "The Chemistry of Commercial Plastics" by Wakeman, published in 1947. While other types of resins may be used, these contact resins or low pressure resins are deemed preferable.

The high frequency used to gel and cure the foam is or may be that of radio frequency, and for treating mattresses which are from 3 to about 4½ inches thick it is found desirable to use a power input of about 25 kilowatts to gel the wet foam, and then about 50 kilowatts is used to cure the somewhat drier foam.

It will be seen from the foregoing that the shaping mold of the present invention for setting and curing foam rubber in a high frequency electrical field is so constructed that it possesses sufficient strength to enable such mold to render long service, and due to the construction of its non-conducting side walls it will not produce arcing or otherwise interfere with the high frequency current which should go through the latex foam mass to internally heat and cure the mass.

Having thus described my invention, what I claim and desire to protect by Letters Patent is:

1. A shaping mold for curing foam rubber in a high frequency electrical field comprising in combination, a female mold member open at its top and adapted to contain foamed rubber, a relatively flat cover for the mold member, the female mold member having a metal inner floor provided with downwardly turned side flanges and an outer floor, and also having upstanding sides bolted to said flanges, said sides being formed of multiple layers of woven glass fiber impregnated and bonded together with a resin and shaped to form a surrounding insulating wall.

2. A shaping mold for curing foam rubber in a high frequency electrical field comprising in combination, a female mold member open at its top and adapted to contain foamed rubber, a relatively flat cover for the mold member, the female mold member having a metal inner floor provided with laterally turned side flanges and an outer floor, and also having upstanding sides bolted to said flanges, said sides being formed of resin impregnated laminated fabric and shaped to form a surrounding insulating wall.

3. A shaping mold for setting and curing foam rubber in a high frequency electrical field comprising in combination, a female mold member open at its top and adapted to contain a quantity of foamed rubber, a relatively flat metal cover for the mold, a metal floor for the mold provided with a surrounding vertically extending metal flange, said mold member having upstanding side walls formed of multiple layers of glass cloth impregnated and bonded together with a resin and adapted to form a surrounding insulating wall that is firmly clamped to said flange.

4. A shaping mold for setting and curing foam rubber in a high frequency electrical field comprising in combination, a female mold member open at its top and adapted to contain a quantity of foamed rubber, a relatively flat metal cover for the mold, a metal floor for the mold provided with a surrounding vertically extending metal flange, said mold member having upstanding side walls formed of multiple layers of glass cloth impregnated and bonded together with a resin and adapted to form a surrounding insulating wall having a reinforcing bead at its upper end and having its lower wall portion firmly clamped to said flange.

5. A shaping mold for setting and curing foam rubber in a high frequency electrical field comprising in combination, a female mold member open at its top and adapted to contain a quantity of foamed rubber, a relatively flat metal cover for the mold, a metal inner floor and a metal outer floor for the mold, each floor carrying at its outer periphery a vertically extending metal strip, and upstanding side walls formed of several plies of resin impregnated glass cloth and forming a surrounding insulating wall that is firmly clamped between said metal strips.

BENJAMIN H. SCOTT.

REFERENCES CITED

The following references are of record in the file of this patent:

UNITED STATES PATENTS

| Number | Name | Date |
|---|---|---|
| 2,147,218 | Reimel | Feb. 14, 1939 |
| 2,325,637 | Stewart | Aug. 3, 1943 |
| 2,351,529 | Luxenberger et al. | June 13, 1944 |
| 2,441,548 | Sperry | May 11, 1948 |